United States Patent
Hayami et al.

(10) Patent No.: US 11,979,080 B2
(45) Date of Patent: May 7, 2024

(54) ELECTRIC MOTOR

(71) Applicant: Mitsubishi Electric Corporation, Tokyo (JP)

(72) Inventors: Naoki Hayami, Tokyo (JP); Tetsuya Sakurada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 272 days.

(21) Appl. No.: 17/638,876

(22) PCT Filed: Sep. 4, 2019

(86) PCT No.: PCT/JP2019/034734
§ 371 (c)(1),
(2) Date: Feb. 28, 2022

(87) PCT Pub. No.: WO2021/044541
PCT Pub. Date: Mar. 11, 2021

(65) Prior Publication Data
US 2022/0407389 A1    Dec. 22, 2022

(51) Int. Cl.
*H02K 9/22* (2006.01)
*H02K 1/04* (2006.01)

(52) U.S. Cl.
CPC ............... *H02K 9/227* (2021.01); *H02K 1/04* (2013.01)

(58) Field of Classification Search
CPC ............... H02K 1/04; H02K 5/02; H02K 5/08
See application file for complete search history.

(56) References Cited

U.S. PATENT DOCUMENTS

| 2003/0222515 A1 | 12/2003 | Ueda et al. |
| 2023/0238840 A1* | 7/2023 | Hiratsuka ............... H02K 5/24 310/216.113 |

FOREIGN PATENT DOCUMENTS

| JP | H07213016 A | 8/1995 |
| JP | 2004007874 A | 1/2004 |
| JP | 2014023198 A | 2/2014 |

OTHER PUBLICATIONS

International Search Report (PCT/ISA/210) with translation and Written Opinion (PCT/ISA/237) dated Oct. 21, 2019, by the Japan Patent Office as the International Searching Authority for International Application No. PCT/JP2019/034734. (7pages).

* cited by examiner

*Primary Examiner* — Daniel C Puentes
*Assistant Examiner* — Minki Chang
(74) *Attorney, Agent, or Firm* — BUCHANAN INGERSOLL & ROONEY PC

(57) ABSTRACT

An electric motor includes a shaft that is rotatably supported for rotation around a rotation axis, a rotor that is located outwardly of the shaft in a radial direction and rotates integrally with the shaft, a stator that faces the rotor in the radial direction, and a tubular frame that has an inner peripheral surface to which the stator is fixed. The electric motor further includes a groove included in (i) the inner peripheral surface of the frame or (ii) an outer peripheral surface of the stator, and an insulating member disposed in the groove.

5 Claims, 10 Drawing Sheets

ELECTRIC MOTOR

TECHNICAL FIELD

The present disclosure relates to an electric motor.

BACKGROUND ART

An electric motor includes a shaft, a rotor that is fixed to and rotates integrally with the shaft, a stator that faces the rotor with a spacing therebetween in a radial direction, and a frame to which the stator is fixed. Energizing the electric motor increases temperatures of a stator core and a stator coil that are included in the stator and temperatures of a rotor core and a rotor conductor that are included in the rotor. The increase in the temperatures of the stator core and the stator coil leads to an increase in temperature of the frame to which the stator is fixed.

For cooling of structural elements of the electric motor, the electric motor includes a fan that is fixed to and rotates integrally with the shaft. Rotation of the fan causes air outside of the electric motor to flow inside, flow through the inside of the electric motor, and flow out to the outside of the electric motor, resulting in cooling of the stator core, the stator coil, the rotor core, the rotor conductor, and the like. Patent Literature 1 discloses an example of such kind of electric motor. According to the electric motor disclosed in Patent Literature 1, air having flowed inside due to rotation of a fan passes through air holes formed in a stator core and in a rotor core, and then flows outside. This configuration causes cooling of the stator core, the stator coil, the rotor core, and a rotor conductor.

CITATION LIST

Patent Literature

Patent Literature 1: Unexamined Japanese Patent Application Publication No. H7-213016

SUMMARY OF INVENTION

Technical Problem

The electric motor disclosed in Patent Literature 1 includes a frame that has grooves in an inner peripheral surface thereof, in order to suppress an increase in temperature of the frame. Since the grooves are formed in the inner peripheral surface of the frame, an area of contact between the frame and the stator core is small. This configuration reduces an amount of heat transferred from the stator core to the frame, thereby suppressing the increase in the temperature of the frame. However, when a gap arises between the stator and the frame by forming the groove in the frame, rust may occur on an outer peripheral surface of the stator that faces the gap and on the inner peripheral surface of the frame that faces the gap.

The present disclosure is made in view of the aforementioned circumstances, and an objective of the present disclosure is to provide an electric motor that suppresses an increase in temperature of a frame while suppressing occurrence of rust.

Solution to Problem

To achieve the aforementioned objective, an electric motor according to the present disclosure includes a shaft, a rotor, a stator, a tubular frame, and an insulating member. The shaft is rotatably supported for rotation around a rotation axis. The rotor is located outwardly of the shaft in a radial direction and rotates integrally with the shaft. The stator faces the rotor with a spacing therebetween in the radial direction. The stator is fixed to an inner peripheral surface of the frame. A groove is included in (i) the inner peripheral surface of the frame or (ii) an outer peripheral surface of the stator, and the insulating member is disposed in the groove.

Advantageous Effects of Invention

According to the present disclosure, the insulating member that is disposed in the groove included in (i) the inner peripheral surface of the frame or (ii) the outer peripheral surface of the stator prevents transfer of heat from the stator to the frame, thereby suppressing an increase in temperature of the frame. Further, filling the groove with the insulating member suppresses occurrence of rust on the inner peripheral surface of the frame that faces the groove and on the outer peripheral surface of the stator that faces the groove.

DESCRIPTION OF EMBODIMENTS

Figure 1:
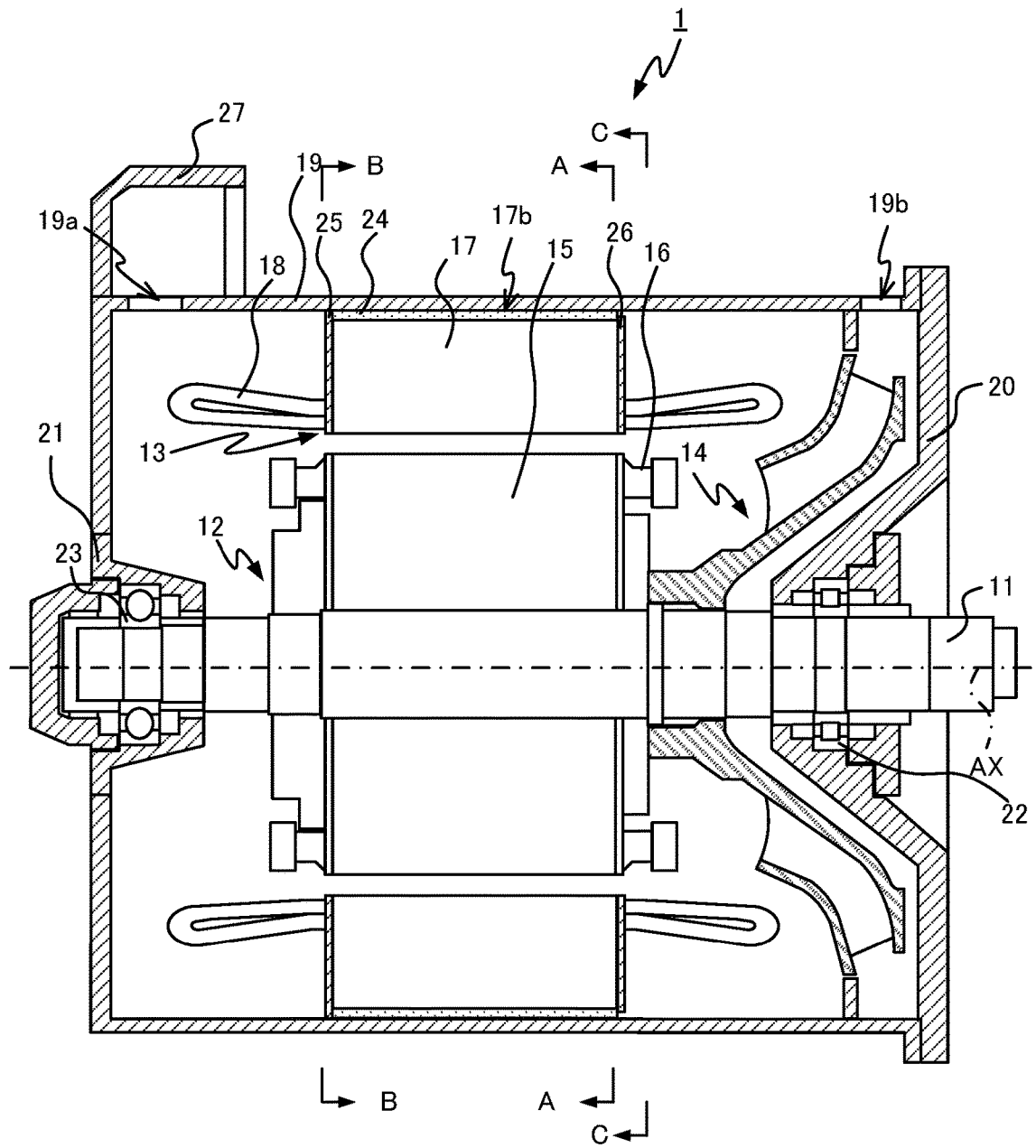
FIG. 1 is a cross-sectional view of an electric motor according to Embodiment 1 of the present disclosure.
Figure 1:
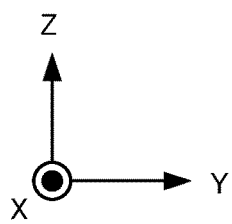

Hereinafter, embodiments of an electric motor according to the present disclosure are described in detail with reference to the drawings. In the drawings, components that are the same or equivalent are assigned the same reference sign.

Embodiment 1

An electric motor according to Embodiment 1 is described using, as an example, an electric motor used for driving a railroad vehicle. FIG. 1 illustrates an electric motor 1 according to Embodiment 1. In FIG. 1, the Z-axis is a vertical direction, the Y-axis is parallel to a rotation axis AX of a shaft 11, and the X-axis is orthogonal to the Y-axis and the Z-axis. In FIG. 1, the dashed-dotted line indicates the rotation axis AX. The electric motor 1 illustrated in FIG. 1 includes the shaft 11 that is rotatably supported for rotation around the rotation axis AX, a rotor 12 that is located outwardly of the shaft 11 in a radial direction and rotates integrally with the shaft 11, a stator 13 that faces the rotor 12 in the radial direction, and a fan 14 that rotates integrally with the shaft 11.

The electric motor 1 further includes a tubular frame 19 that includes an inflow hole 19a through which air of the outside flows into the inside and an outflow hole 19b through which the air having flowed in flows out. Additionally, the electric motor 1 includes a first bracket 20 and a second bracket 21 that are fixed to the frame 19. Moreover, the electric motor 1 includes: bearings 22 and 23 that rotatably support the shaft 11; an insulating member 24 that is filled in grooves in the stator 13; a first end plate 25 that closes one end of each groove in the stator 13 and has an outer peripheral surface contacting an inner peripheral surface of the frame 19; and a second end plate 26 that has an outer peripheral surface facing the inner peripheral surface of the frame 19 with a spacing therebetween in the radial direction and that, together with the first end plate 25, sandwiches the stator 13.

Each component of the electric motor 1 is described in detail. The shaft 11 has one end that is close to the first bracket 20 and is coupled to an axle of the railroad vehicle via non-illustrated coupling and gear, and rotation of the shaft 11 generates motive power of the railroad vehicle.

The rotor 12 includes a rotor core 15 that is fitted to the shaft 11, and rotor conductors 16 that are inserted into slots formed in an outer peripheral surface of the rotor core 15. Since the rotor core 15 is fixed to the shaft 11, the rotor 12 that includes the rotor core 15 and the rotor conductors 16 rotates integrally with the shaft 11.

Figure 2:
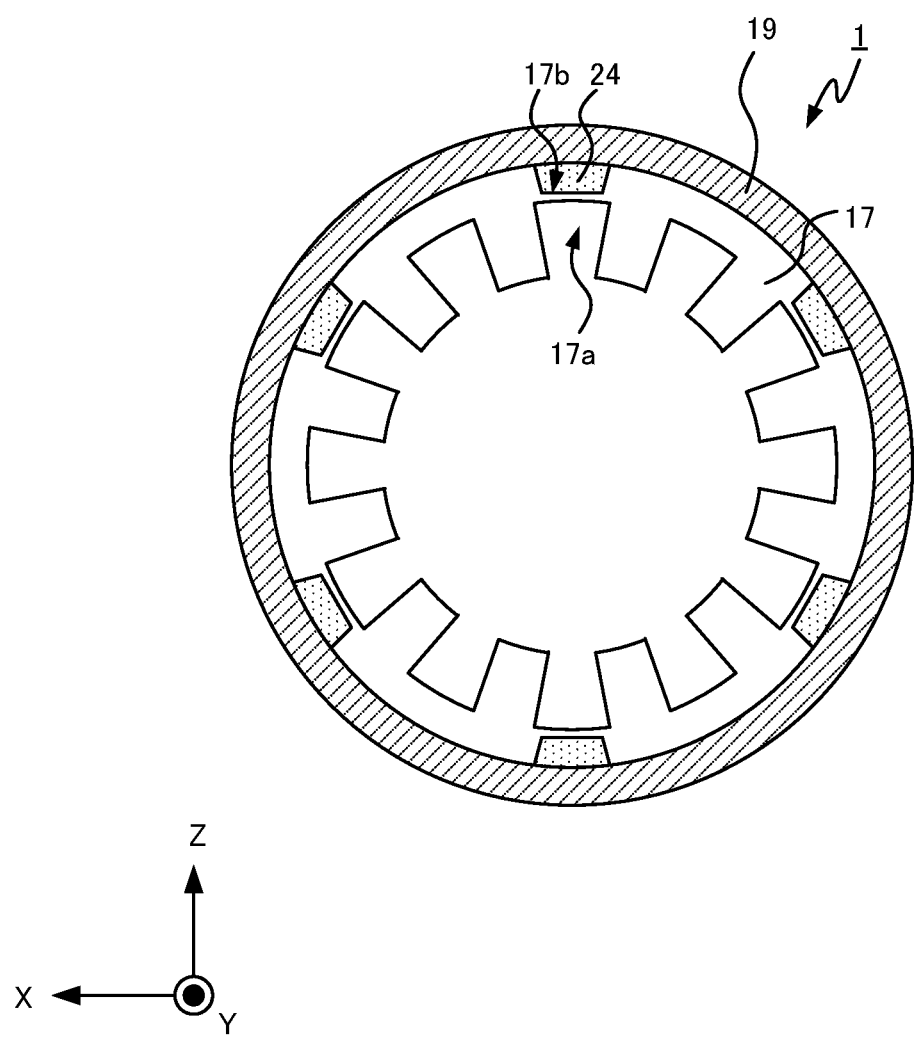
FIG. 2 is a cross-sectional view of the electric motor according to Embodiment 1, taken along the line A-A of FIG. 1.

The stator 13 includes a stator core 17 and coils 18 that are inserted into slots formed in the stator core 17. Specifically, as illustrated in FIG. 2 that is a cross-sectional view taken along the line A-A of FIG. 1, the stator core 17 has slots 17a into which the coils 18 are inserted, and has, in an outer peripheral surface thereof, grooves 17b in which the insulating member 24 is filled. FIG. 2 illustrates the frame 19 and the stator core 17 only, in order to avoid complicated illustration. In Embodiment 1, the grooves 17b extend in parallel to the rotation axis AX and are formed across the entire length of the stator core 17 in an extension direction of the rotation axis AX.

Figure 3:
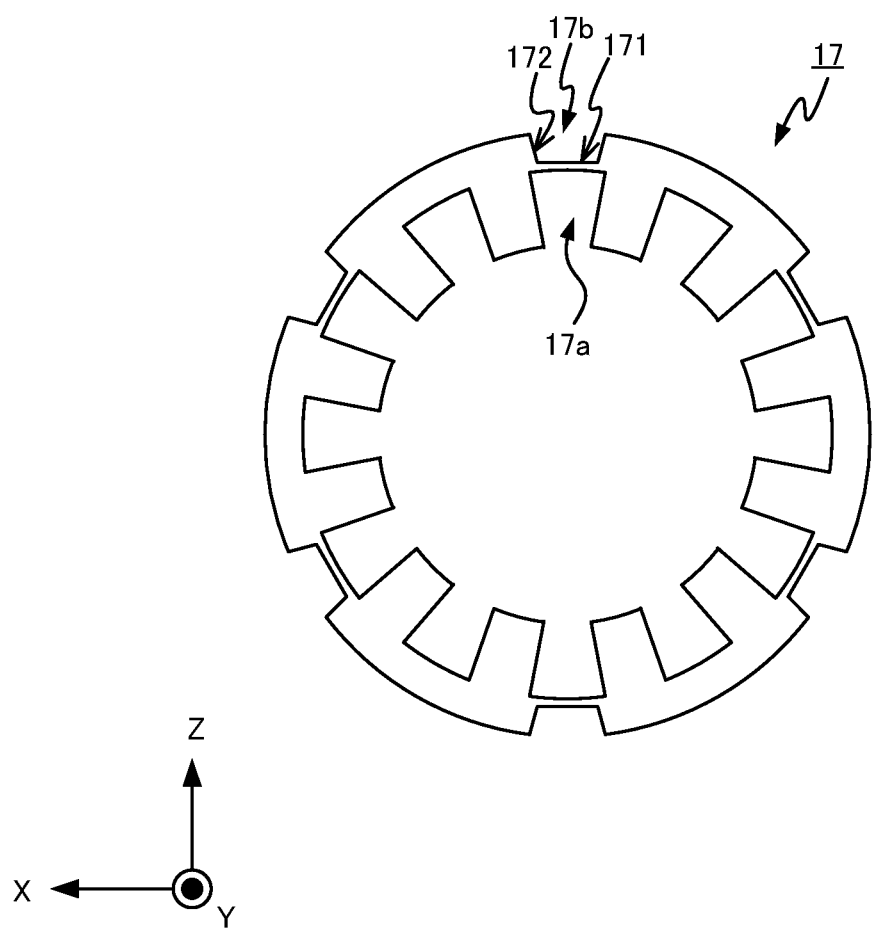
FIG. 3 is a side view of a stator core according to Embodiment 1.

As illustrated in FIG. 3, each of the grooves 17b is formed by (i) a bottom surface 171 including a plane surface and (ii) two side surfaces 172 each including a plane surface and extending from the bottom surface 171 in the radial direction. The widths of the grooves 17b in the radial direction and in a circumferential direction are determined based on a needed strength for the stator core 17, a degree of increase in temperature of the frame 19 due to energization of the electric motor 1, or the like.

The fan 14 has a main surface facing the first bracket 20 and rotates integrally with the shaft 11. Integral rotation of the fan 14 with the shaft 11 causes air of the outside of the electric motor 1 to flow in through the inflow hole 19a, and the air having flowed in flows out to the outside of the electric motor 1 through the outflow hole 19b.

The frame 19 houses the rotor 12, the stator 13, the shaft 11, and the fan 14. The inflow hole 19a is formed (i) in one end portion of both end portions of the frame 19 in the extension direction of the rotation axis AX and (ii) in an upper side surface of the one end portion with respect to the vertical direction. Additionally, the outflow hole 19b is formed (i) in the other end portion of both the end portions of the frame 19 in the extension direction of the rotation axis AX, and (ii) in an upper side surface of the other end portion with respect to the vertical direction. Further, in order to suppress foreign objects from entering into the inside of the electric motor 1 through the inflow hole 19a, a cover 27 for covering the inflow hole 19a is attached to an outer peripheral surface of the frame 19.

The first bracket 20 and the second bracket 21 face each other in the extension direction of the rotation axis AX.

The bearings 22 and 23 rotatably support the shaft 11 for rotation around the rotation axis AX, as illustrated in FIG. 1.

A desirable insulating member 24 is made of a nonmagnetic insulator. For example, the insulating member 24 is made of epoxy resin. The insulating member 24 is filled in the grooves 17b in the stator core 17 and contacts the outer peripheral surface of the stator core 17 and the inner peripheral surface of the frame 19. The insulating member 24 is filled in the grooves 17b by performing impregnation processing of the stator core 17 with the coils 18 inserted into the slots 17a.

Figure 4:
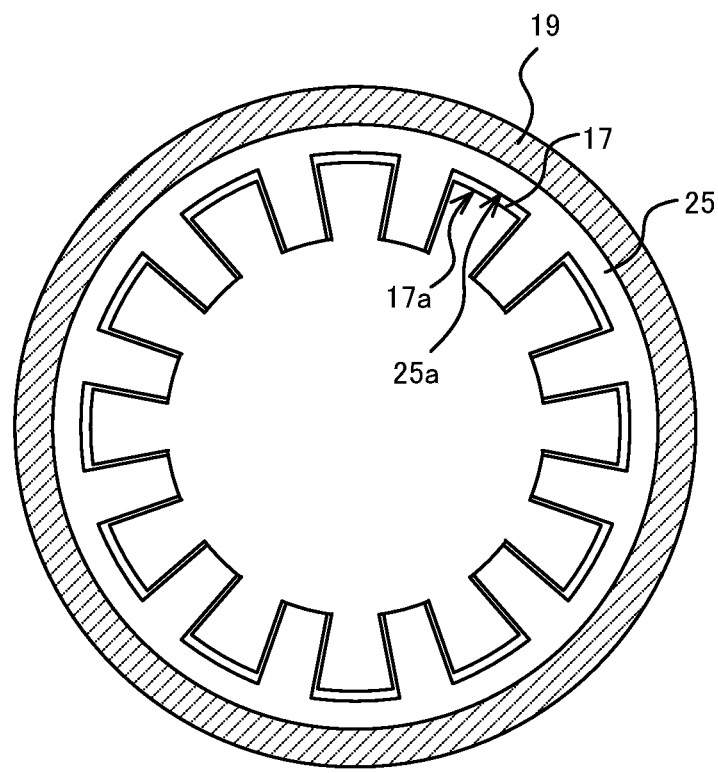
FIG. 4 is a cross-sectional view of the electric motor according to Embodiment 1, taken along the line B-B of FIG. 1.
Figure 4:
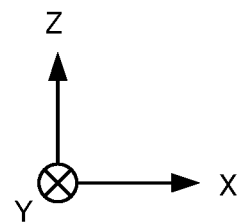

The first end plate 25 closes one end of each groove 17b of the stator core 17 that is close to the inflow hole 19a, and the outer peripheral surface of the first end plate 25 contacts the inner peripheral surface of the frame 19. Specifically, as illustrated in FIG. 4 that is a cross-sectional view taken along the line B-B of FIG. 1, the first end plate 25 has an annular shape and has, in an inner peripheral surface, slots 25a through which the coils 18 pass. The first end plate 25 is fixed to an end surface of the stator core 17 that is close to the inflow hole 19a. The first end plate 25 is fixed to the stator core 17 by, for example, welding, caulking, shrink fitting, or the like.

Figure 5:
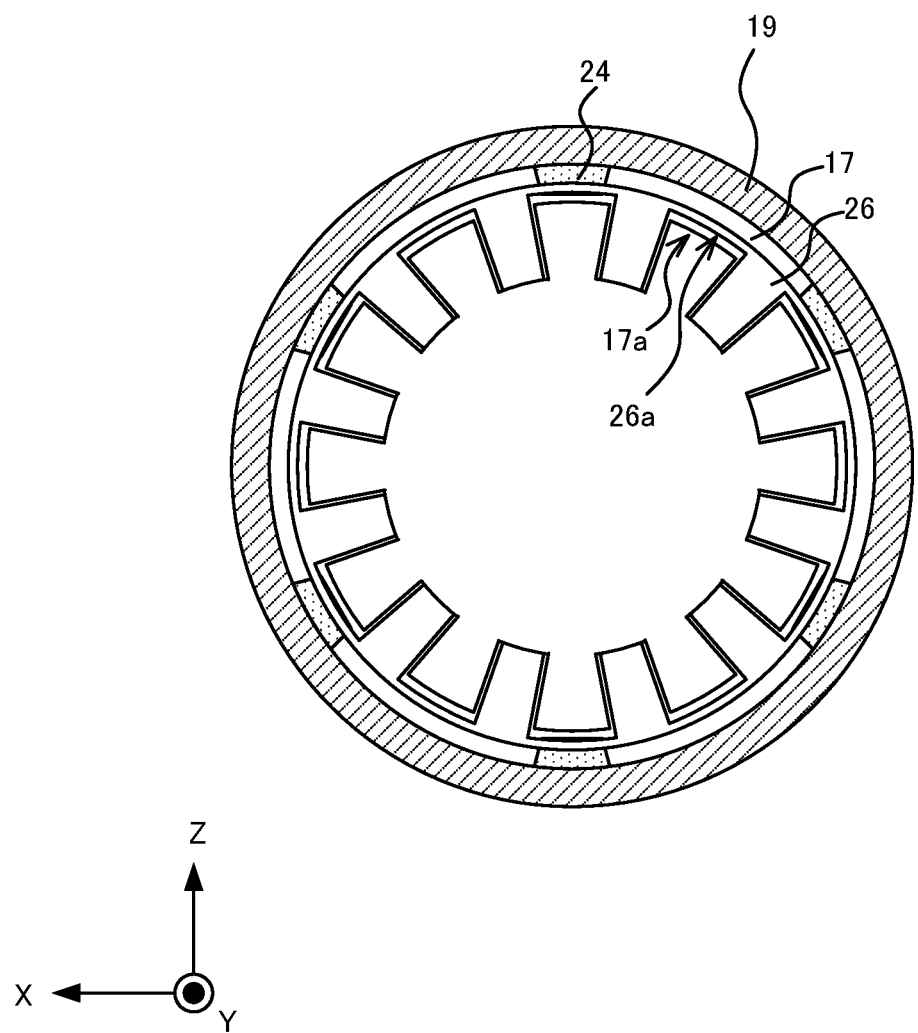
FIG. 5 is a cross-sectional view of the electric motor according to Embodiment 1, taken along the line C-C of FIG. 1.

The second end plate 26 closes a part of the other end of each groove 17b of the stator core 17, in other words, closes a part of one end of each groove 17b that is close to the outflow hole 19b, and the outer peripheral surface of the second end plate 26 faces the inner peripheral surface of the frame 19 with a spacing therebetween in the radial direction. Specifically, as illustrated in FIG. 5 that is a cross-sectional view taken along the line C-C of FIG. 1, the second end plate 26 has an annular shape and has, in an inner peripheral surface, slots 26a through which the coils 18 pass. The second end plate 26 is fixed to an end surface of the stator core 17 that is close to the outflow hole 19b, and sandwiches the stator core 17 with the first end plate 25. The second end plate 26 is fixed to the stator core 17 by, for example, shrink fitting.

As described above, according to the electric motor 1 according to Embodiment 1, the insulating member 24 filled in the grooves 17b prevents transfer of heat from the stator 13 to the frame 19, thereby suppressing an increase in temperature of the frame 19. Further, filling the grooves 17b with the insulating member 24 suppresses occurrence of rust on the inner peripheral surface of the frame 19 that faces the grooves 17b and on the outer peripheral surface of the stator core 17 that faces the grooves 17b.

Additionally, forming the grooves 17b in the outer peripheral surface of the stator core 17 where magnetic flux density is low enables reduction of in effect, on the magnetic field of the stator 13, of arranging the grooves 17b.

Making the insulating member 24 by a nonmagnetic insulator suppresses a portion of the frame 19 that contacts the insulating member 24 from becoming a magnetic path, thereby suppressing occurrence of core loss in the frame 19. Additionally, filling the insulating member 24 in the grooves 17b enables suppression of the decrease in strength of the stator core 17 due to forming of the grooves 17b.

Embodiment 2

The stator core 17 may have any shape that enables filling the insulating member 24 between the stator core 17 and the frame 19. In Embodiment 2, a configuration in which each of the grooves 17b has a non-constant width in the radial direction is described as an example.

Figure 6:
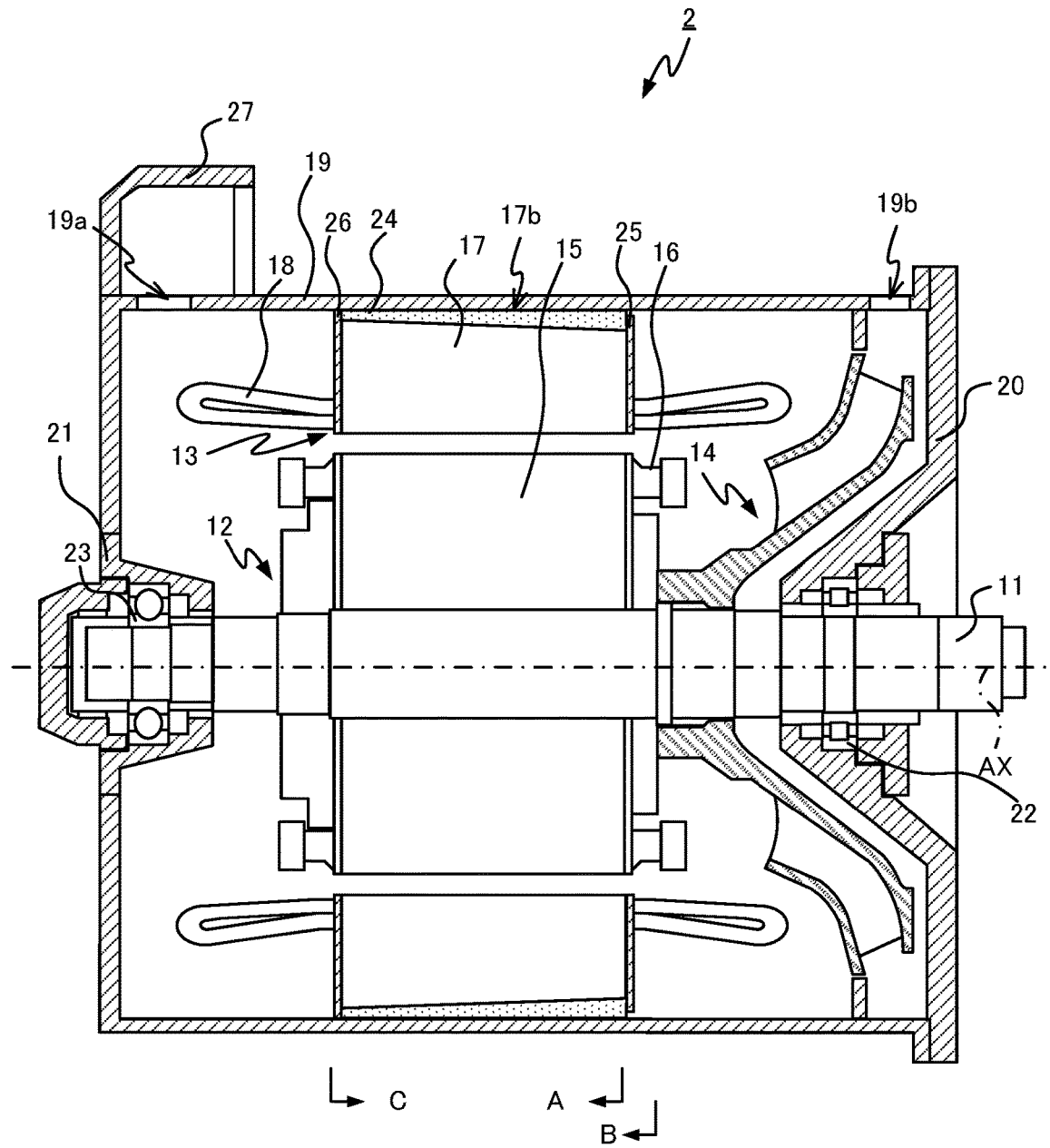
FIG. 6 is a cross-sectional view of an electric motor according to Embodiment 2 of the present disclosure.
Figure 6:
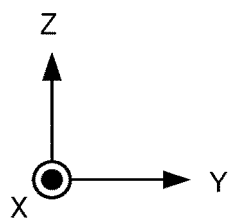

As illustrated in FIG. 6, an electric motor 2 according to Embodiment 2 includes a stator core 17 that has grooves 17b each having a non-constant width in the radial direction. Specifically, each of the grooves 17b has one end that is close to the inflow hole 19a and is narrower in width in the radial direction than the other end of the groove 17b, in other words, than one end of the groove 17b that is close to the outflow hole 19b.

As described above, according to the electric motor 2 according to Embodiment 2, the insulating member 24 filled in the grooves 17b prevents transfer of heat from the stator 13 to the frame 19, thereby suppressing an increase in temperature of the frame 19. The increase in temperature of the frame 19 is more suppressed as the width of the grooves 17b in the radial direction increases. Further, filling the grooves 17b with the insulating member 24 suppresses occurrence of rust on the inner peripheral surface of the frame 19 that faces the grooves 17b and on the outer peripheral surface of the stator core 17 that faces the grooves 17b.

Additionally, forming the grooves 17b in the outer peripheral surface of the stator core 17 where magnetic flux density is low enables reduction in effect, on the magnetic field of the stator 13, of arranging the grooves 17b.

Making the insulating member 24 by a nonmagnetic insulator suppresses a portion of the frame 19 that contacts the insulating member 24 from becoming a magnetic path, thereby suppressing occurrence of core loss in the frame 19.

Figure 7:
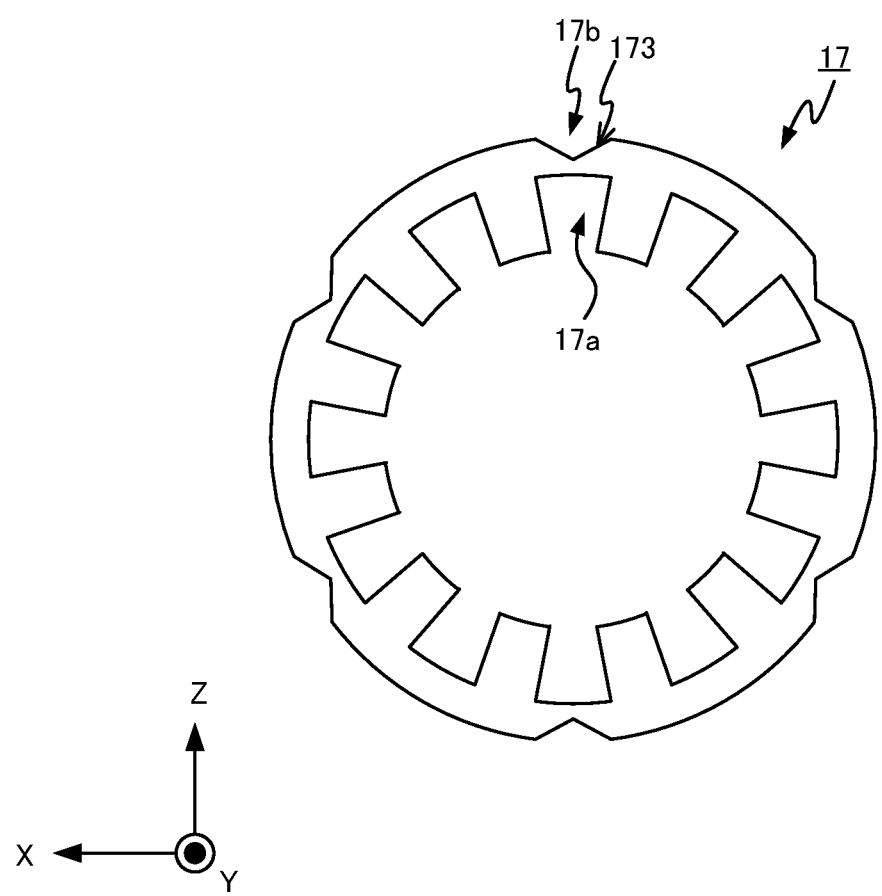
FIG. 7 is a side view of a first modified example of a stator core according to the embodiments.
Figure 8:
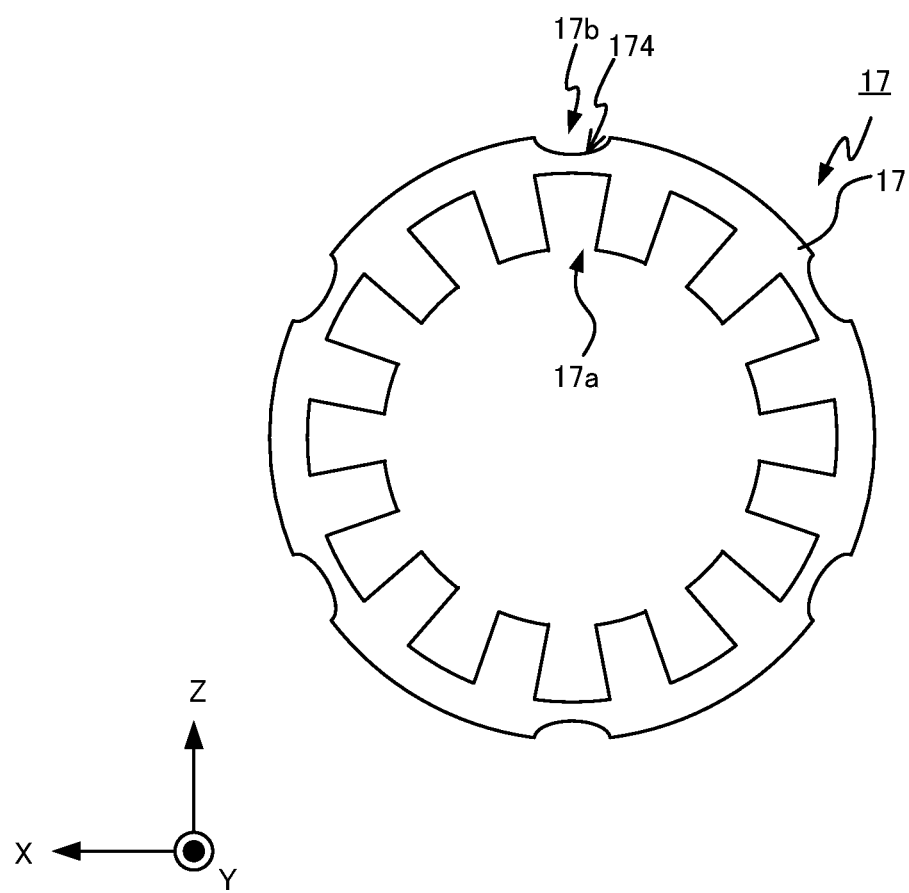
FIG. 8 is a side view of a second modified example of the stator core according to the embodiments.

The present disclosure is not limited to the aforementioned embodiments. The stator core 17 may have any shape that enables filling the insulating member 24 between the stator core 17 and the frame 19. In one example, as illustrated in FIG. 7, each of the grooves 17b may be formed by two side surfaces 173 that each includes a plane surface. In another example, as illustrated in FIG. 8, each of the grooves 17b may be formed by a curved surface 174.

The grooves 17b may extend in any direction. In one example, the grooves 17b may extend in a direction that intersects the rotation axis AX. In another example, the grooves 17b may extend in the circumferential direction.

Further, the width of the grooves 17b in the radial direction may change in a stepwise manner.

Moreover, the number of the grooves 17b may be freely selected.

The shapes of the inflow hole 19a and the outflow hole 19b and the positions at which the inflow hole 19a and the outflow hole 19b are arranged may be any shapes and positions that allow air to flow inside of the electric motors 1-3. In one example, the inflow hole 19a may be formed in a surface of the frame 19 that intersects the rotation axis AX.

Figure 9:
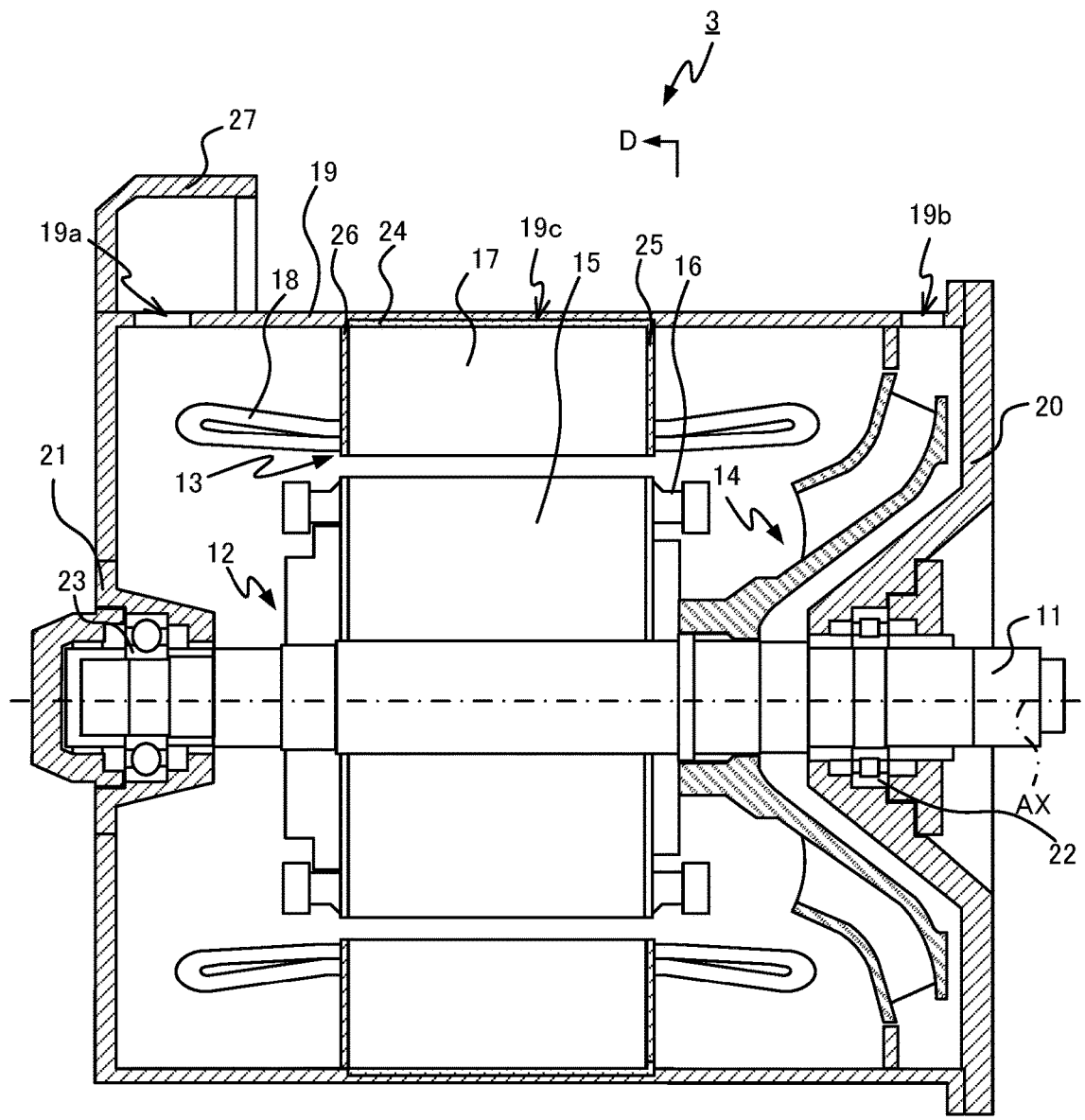
FIG. 9 is a cross-sectional view of a modified example of the electric motor according to the embodiments.
Figure 10:
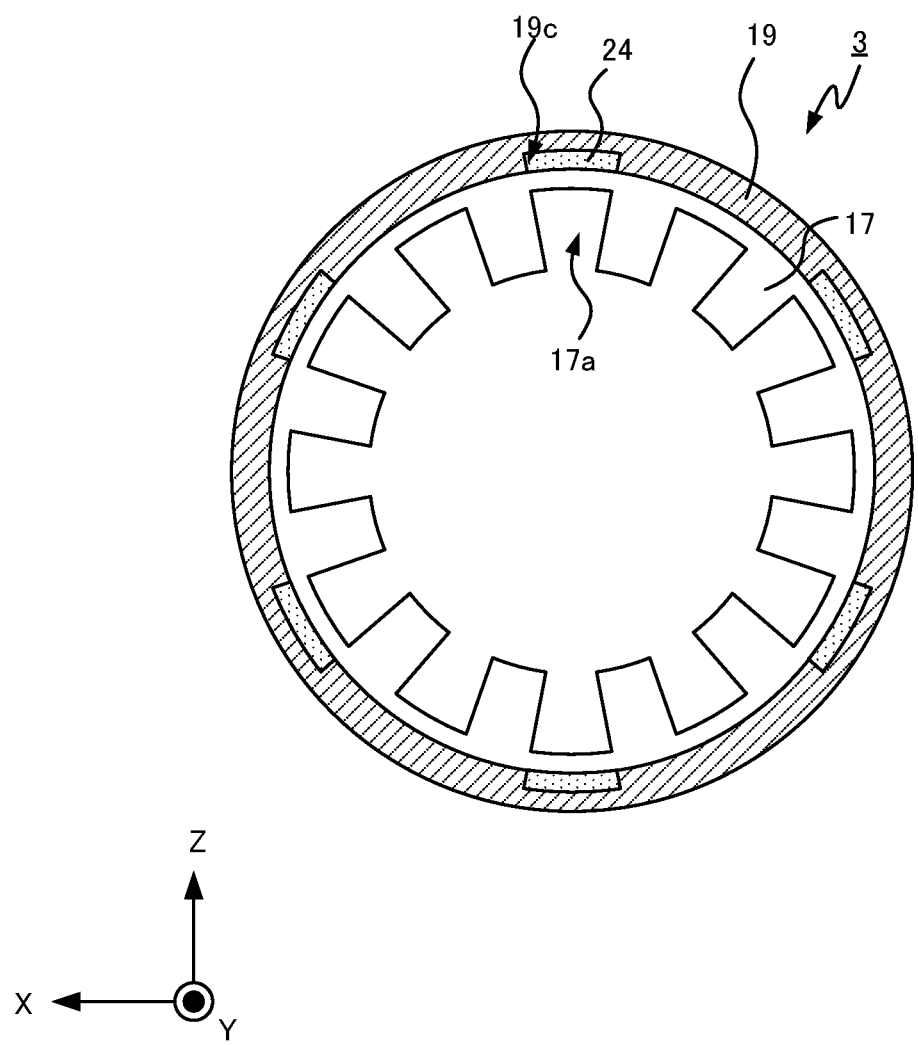
FIG. 10 is a cross-sectional view of the modified example of the electric motor according to the embodiments, taken along the line D-D of FIG. 9.

The insulating member 24 may be filled in grooves formed in the frame 19. In one example, the insulating member 24 may be, as is in the electric motor 3 illustrated in FIG. 9, and in FIG. 10 that is a cross-sectional view taken along the line D-D of FIG. 9, filled in grooves 19c formed in the frame 19. Further, the grooves 19c may have any shape that enables filling the insulating member 24 between the stator core 17. In one example, the grooves 19c may have a shape similar to those of the grooves 17b illustrated in FIGS. 7 and 8. The grooves 19c may have a constant width in the radial direction, or may have a non-constant width in the radial direction.

The insulating member 24 may be filled in the grooves 17b or the grooves 19c after the stator core 17 is fixed to the frame 19.

The first end plate 25 may be fixed to an end surface of the stator core 17 that is close to the first bracket 20. In this case, the second end plate 26 is fixed to an end surface of the stator core 17 that is close to the second bracket 21.

Although the electric motors 1-3 are open type motors that take in air of the outside to the inside of the electric motors 1-3, the electric motors 1-3 may be totally-enclosed type motors that do not take in air of the outside to the inside of the electric motors 1-3.

Further, the electric motors 1-3 may be electric motors that do not include the fan 14 and that employ a forced-air cooling system of taking, to the inside of the electric motors 1-3, air supplied from a blower disposed outside of the electric motors 1-3.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1,2,3 Electric motor
11 Shaft
12 Rotor
13 Stator
14 Fan
15 Rotor core
16 Rotor conductor
17 Stator core
17a, 25a, 26a Slot
17b, 19c Groove
18 Coil
19 Frame
19a Inflow hole
19b Outflow hole
20 First bracket
21 Second bracket
22, 23 Bearing
24 Insulating member
25 First end plate
26 Second end plate
27 Cover
171 Bottom surface
172, 173 Side surface
174 Curved surface
AX Rotation axis

The invention claimed is:
1. An electric motor comprising:
a shaft that is rotatably supported for rotation around a rotation axis;
a rotor that is located outwardly of the shaft in a radial direction and rotates integrally with the shaft;
a stator that faces the rotor with a spacing therebetween in the radial direction;

a tubular frame that has an inner peripheral surface to which the stator is fixed;
a groove included in an outer peripheral surface of the stator; and
an insulating member disposed in the groove, wherein the insulating member suppresses transfer of heat from the stator to the frame.

2. The electric motor according to claim 1, wherein the groove is formed across an entire length of the stator in an extension direction of the rotation axis.

3. The electric motor according to claim 2, wherein
the groove extends along the rotation axis, and
the electric motor further comprises a first end plate that closes one end of the groove and that has an outer peripheral surface contacting the inner peripheral surface of the frame.

4. The electric motor according to claim 3, further comprising:
a second end plate that has an outer peripheral surface facing the inner peripheral surface of the frame with a spacing therebetween in the radial direction and that, together with the first end plate, sandwiches the stator.

5. The electric motor according to claim 4, wherein the one end of the groove is narrower in width in the radial direction than another end of the groove.

* * * * *